Patented Feb. 28, 1933

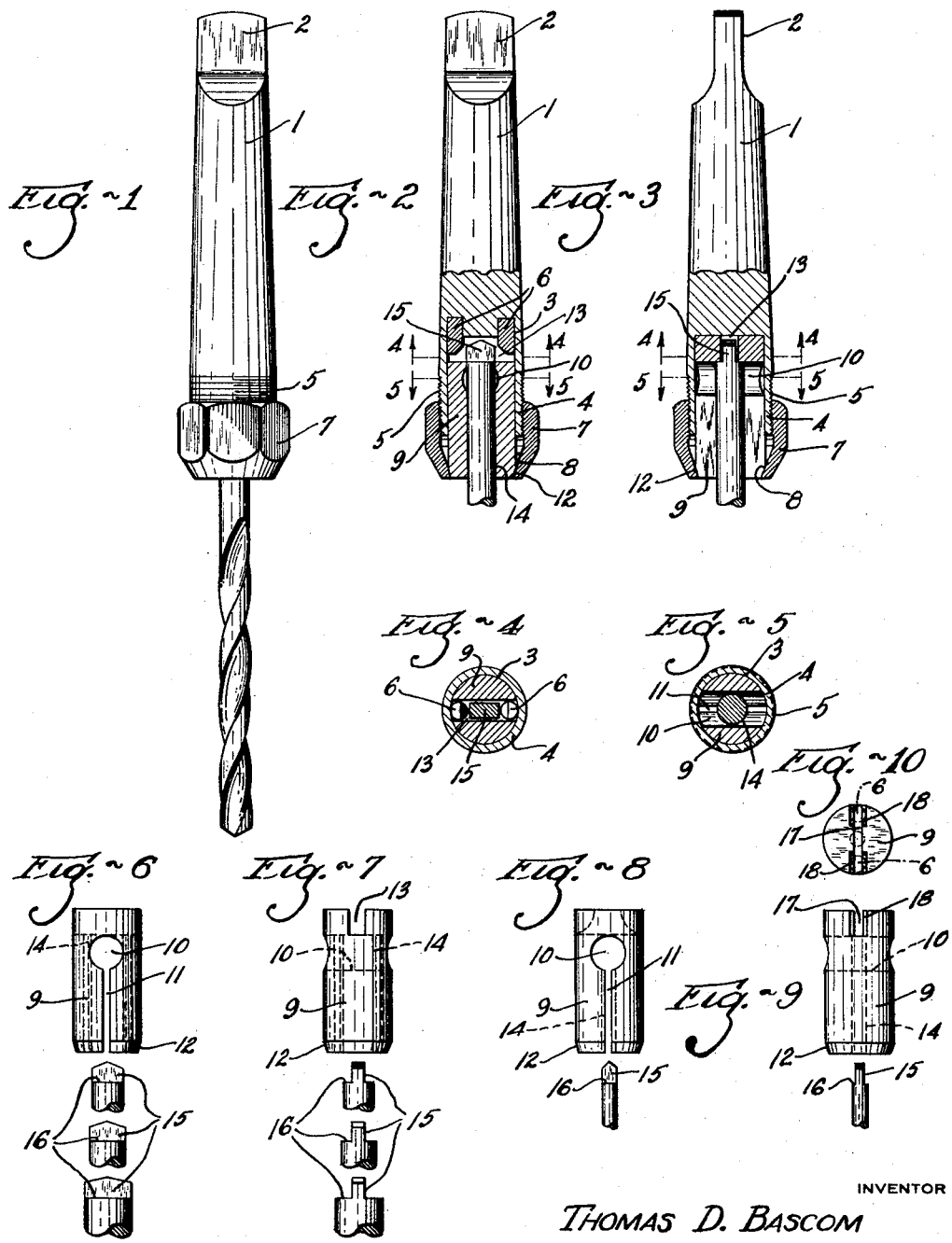

1,899,843

UNITED STATES PATENT OFFICE

THOMAS D. BASCOM, OF CLEVELAND, OHIO, ASSIGNOR TO THE STANDARD TOOL COMPANY, OF CLEVELAND, OHIO, A CORPORATION OF OHIO

TOOL HOLDER

Application filed January 21, 1931. Serial No. 510,136.

The invention disclosed in this application relates to a combined tool holder and tool.

The object of the present invention is to provide a combined tool holder and tool wherein tools, like drills, taps or the like, are rigidly held in the tool holder and provision is made between the holder and the tool itself for producing a positive drive which will prevent slippage and produce more effective work.

The invention will be brought out in the following description, drawing and claim.

Referring to the drawing, Fig. 1 is an elevation of the combined holder and tool; Fig. 2 is a view partly in vertical section; Fig. 3 is a similar view taken at 90°; Fig. 4 is a section upon the line 4—4, Figs. 2 and 3; Fig. 5 is a section upon the line 5—5, Figs. 2 and 3; Fig. 6 is a view in elevation showing a single collet member, with dotted lines indicating the different bores for the different tools, together with the upper ends of different tools of different sizes; Fig. 7 is a similar view taken at 90°; Fig. 8 shows the collet member for drills of small size; Fig. 9 is a view taken at 90°; and Fig. 10 is a top plan view of the collet.

In the embodiment shown, 1 represents a holder shank of the usual tapered form having the usual driving tongue 2. This shank and tongue fit into the socket of the driving spindle of the drill press or other machine, and the tapered arrangement serves to snugly hold the shank in place. This shank has a bore 3 at its lower end forming a sleeve portion 4 which is externally threaded at 5. In the bottom of the bore are arranged suitable pins 6, as shown in Figs. 2 and 4. Engaging the threads 5 of the sleeve portion 4 is a clamping nut 7 having an internally tapered face 8.

Engaging in the sleeve portion 4 is a collet member 9 provided with a transverse opening 10 near one end, Fig. 6, and a diametrical slot 11 extending out from this opening 10 to the end of the collet member. The two half-round portions thus formed are provided with tapered seats 12 for engagement by the tapered face 8 of the clamping nut 7, so that when the clamping nut is drawn up, the collet member is collapsed upon the tool. The upper end of the collet member is transversely slotted, as indicated at 13, and this slot is adapted to engage the pins 6 and provide a drive between the shank 1 and the collet member. There are a plurality of collet members, one for each drill, tap or other tool, and each is provided with a proper sized opening or bore 14 for receiving the particular drill, tap or other tool. The bore in each case extends up to the bottom of the slot 13, as shown in Figs. 6 and 7.

Each of the drills, taps or other tools is provided at its shank end with a driving blade, indicated at 15, and this driving blade is similar to the driving blade 2 and is formed by flattening the sides of the shank. These blades are adapted to fit up into the slots 13 of the collet members and the shoulders 16 of the tools form a stop so that the operative may be sure that the tool passes up into locked position.

Where small drills and taps are utilized and the shanks are of less diameter than the thickness of the pins 6, the heads of the collet members are arranged as shown in Figs. 8, 9 and 10, wherein the collet members are provided with narrow slots, indicated at 17, and these slots are of a width such that they will properly receive the driving blades of the smaller sized tools. In order to still maintain the drive between the collet members and the shank, the heads are milled inwardly from each side to provide recesses 18 for engagement with the pins 6, in spite of the intermediate slot 17 being much narrower.

In use the operative selects his drill, tap or other tool and also selects the proper collet member to go with it. He then inserts these two parts in the sleeve portion and draws up the clamping nut. The clamping effect of course creates collapse of the half-round portions of the collet member upon the shank of the drill and holds it firmly. The blade of the shank is driven positively from the drill spindle; the collet member is driven through the pins 6; and the blade of the drill is driven by the walls of the slots 13 in the head of the collet member.

Having thus described my invention, I claim:

In combination, a tool holder and a tool adapted to be removably connected thereto for rotation therewith, said holder having a shank provided at its tool-holding end with a clamping nut threaded thereon, said tool-holding shank end being also provided with a generally cylindrical, axially disposed socket for receiving a collet and the connecting end of the tool, said collet being adapted to receive said tool connecting end, said shank being provided at the inner end of said socket with two diametrically opposed driving pins projecting into said socket inner end, said collet being a one-piece member provided at its inner end with a diametrically disposed slot for receiving the driving pins of said shank, whereby said collet is connected to said shank for rotation therewith, said collet being provided at its outer end with a pair of clamping jaws adapted to be clamped about said tool by said clamping nut, said tool being provided at its connecting end with a driving tang adapted to extend into the diametrically disposed slot of said collet, whereby said tool is connected to said collet for rotation therewith.

In testimony whereof I hereby affix my signature.

THOMAS D. BASCOM.